Dec. 14, 1954  R. O. ENDRES  2,696,739
TEMPERATURE RESPONSIVE SEMICONDUCTOR CIRCUITS
Filed July 5, 1951  2 Sheets-Sheet 1

Inventor
Richard O. Endres
By
Attorney

Dec. 14, 1954 R. O. ENDRES 2,696,739
TEMPERATURE RESPONSIVE SEMICONDUCTOR CIRCUITS
Filed July 5, 1951 2 Sheets-Sheet 2

Inventor
Richard O. Endres
Attorney

United States Patent Office 2,696,739
Patented Dec. 14, 1954

2,696,739.

TEMPERATURE RESPONSIVE SEMICONDUCTOR CIRCUITS

Richard O. Endres, Moorestown, N. J., assignor to Radio Corporation of America, a corporation of Delaware Application July 5, 1951, Serial No. 235,332

5 Claims. (Cl. 73—362)

This invention relates generally to electrical temperature indicating systems, and has for its primary object to provide a temperature responsive electronic circuit utilizing a semi-conductor device.

Experiments have shown that a semi-conductor device such as a transistor is very sensitive to changes of the ambient temperature. In particular, it has been found that the transistor circuit parameters are responsive to changes of the temperature when the transistor is connected, for example, in an amplifier circuit. It is believed that the internal impedances of the transistor such as the internal collector impedance or collector input impedance, that is, the impedance which appears looking into the collector electrode of a transistor is responsive to temperature. It will, of course, be obvious that variations of the internal impedances of a transistor will also cause corresponding variations of the currents flowing through the device. In accordance with the present invention, the variations of the transistor circuit parameters in response to changes of the ambient temperature are utilized to afford an indication of the temperature.

It is, accordingly, a specific object of the present invention to provide a semi-conductor amplifier circuit arranged to be responsive to changes of the ambient temperature of the semi-conductor device.

A further object of the invention is to provide a regenerative transistor circuit wherein relatively large changes of one of the transistor circuit parameters occur in response to changes of the ambient temperature of a transistor, thereby to provide an indication of temperature.

Another object of the invention is to provide a semi-conductor circuit wherein changes of internal impedance of a semi-conductor device or changes of currents flowing through such device in response to ambient temperature changes are utilized to provide temperature indication.

A temperature responsive electronic circuit in accordance with the present invention includes a transistor device connected and operated in a manner to take full advantage of the inherent temperature response characteristics of such devices. A transistor consists of a semiconducting body such, for example, as a crystal of germanium and a base, an emitter and a collector in contact with the crystal. Under proper conditions the transistor has a relatively large change of at least one of its circuit parameters with a simultaneous relatively small change of the current flowing through one of its electrodes in response to changes of the ambient temperature. Thus, the circuit parameter which exhibits a relatively large change may be one of the impedances which appears looking into one of its electrodes, that is, the emitter input, collector input or base input impedance. On the other hand, the circuit parameter which exhibits a relatively large change in response to changes of the ambient temperature may be the collector current, while the simultaneously occurring change of the emitter current is relatively small.

The proper conditions for providing these changes of the circuit parameters are established in accordance with the invention, by connecting an impedance element such as a resistor between the base and a point of fixed potential such as ground. Furthermore, a voltage is applied in the forward direction between emitter and base and another voltage is impressed in the reverse direction between collector and base. These suitably selected voltages in combination with the external base impedance element of suitable magnitude establish the proper conditions so that the circuit will be responsive to small changes of the ambient temperature.

Further in accordance with the invention, if, for example, the base, emitter or collector input impedance exhibits large changes with changes of temperature, the transistor may be connected so that one of its internal impedances forms one of the arms of a bridge network. In that case, changes of the internal transistor impedances are utilized to unbalance the bridge, and this condition may easily be indicated, for example, by a current responsive meter. On the other hand, if the transistor circuit is conditioned so that relatively large changes of the collector current occur in response to changes of the temperature, a current meter may be connected in the collector circuit to indicate these temperature changes.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 1:
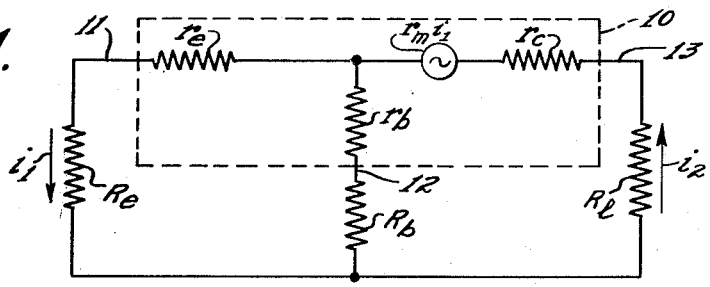
Figure 1 is an equivalent circuit diagram of a regenerative transistor amplifier circuit adapted for operation in a system embodying the invention.

Referring now to the drawings, and particularly to Figure 1, there is illustrated an equivalent circuit of a transistor connected in a regenerative circuit. The transistor device is represented within the dotted rectangle 10 and is shown as a T-network as is conventional. The T-network comprises three arms, two arms including respectively an emitter resistance $r_e$ and a base resistance $r_b$. The third arm includes a collector resistance $r_c$ and an impedanceless voltage generator developing a voltage $r_m \times i_1$, wherein $r_m$ is a resistance. The emitter, base and collector electrodes appear respectively at the points 11, 12 and 13. The emitter current $i_1$ and the collector current $i_2$ have also been indicated in Figure 1. An external impedance element such as a resistor $R_e$ is connected to the emitter electrode and similarly the resistors $R_b$ and $R_1$ are connected to the base and collector.

The circuit illustrated in Figure 1 is highly regenerative due to the provision of the external base resistor $R_b$. The following expression for the emitter input impedance looking into the emitter electrode is derived from the equivalent circuit of Figure 1:

(1)
$$Z_e = \frac{r'_b(1-a') + r'_e}{1-a'}$$

In the above formula $a'$ is defined as follows:

(2)
$$a' = \frac{r_m - r_e}{R_1 + r_e}$$

Furthermore, $r'_b$ and $r'_e$ in Formula 1 are defined as follows:

(3) $\qquad r'_b = r_b + R_b$ (4) $\qquad r'_e = r_e + R_e$

From Equation 1 it will be seen that if $a'$ is smaller than unity, $Z_e$ is positive and finite. If $a' = 1$, $Z_e$ is infinite. Finally, if $a'$ is between 1 and $$\frac{r'_e + r'_b}{R'_b}$$

then $Z_e$ is negative and finite.

Figure 2:
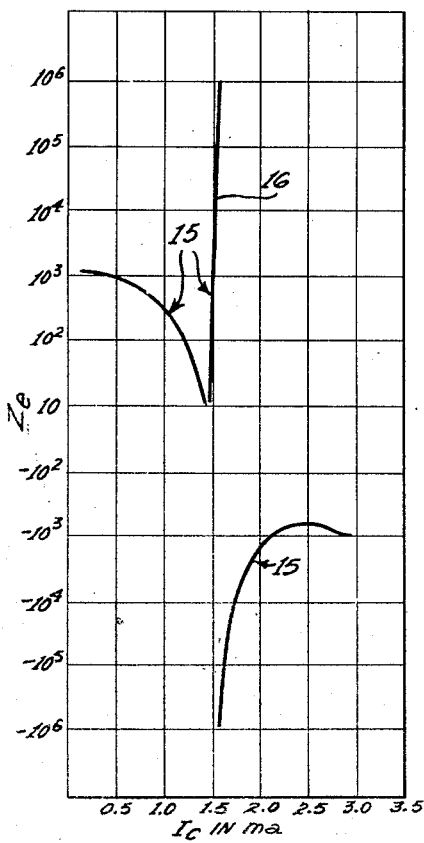
Figures 2 to 4 are graphs showing curves which illustrate respectively the emitter input impedance, the collector input impedance and the base input impedance of the transistor as a function of the collector current and under proper circuit conditions.

Figure 2 to which reference is now made illustrates the emitter input impedance $Z_e$ as a function of the collector current $I_c$. $Z_e$ is the impedance which appears looking into the emitter electrode, that is, the internal emitter impedance or emitter input impedance. The curve 15 of Figure 2, which has been obtained experimentally, verifies the above equations. As the collector current $I_c$ increases from zero, the emitter input impedance $Z_e$ decreases from a finite value to zero, then rapidly increases to infinity whereupon it becomes negative to approach zero again. Curve portion 16 illustrates that the emitter input impedance increases very rapidly from zero to infinity, while the collector current changes by no more than 100 microamperes.

Figure 3:
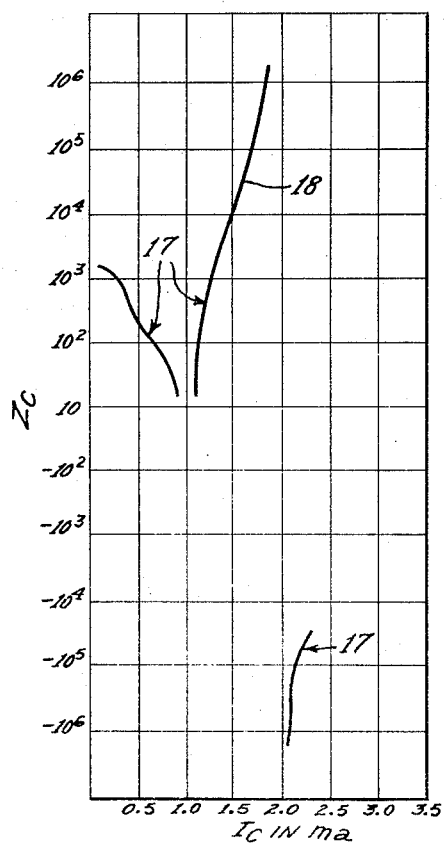

Figure 3 illustrates the collector input impedance $Z_c$, that is, the impedance which appears looking into the collector electrode as a function of the colletcor current $I_c$. The curve 17 of Figure 3 is generally quite similar to the curve 15 of Figure 2 and has been obtained experimentally. Here again, the curve portion 18 shows a rapid change of the collector input impedance from zero to infinity while the collector current changes by a very small amount.

Figure 4:
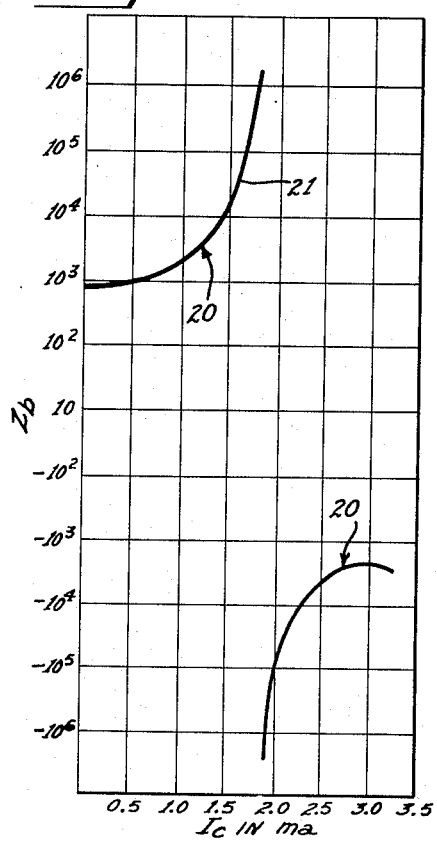

In Figure 4, the base input impedance $Z_b$ is plotted against the collector current $I_c$. Curve 20 shows that the base input impedance increases from a positive value to infinity, then becomes negative and approaches zero again as the collector current increases. Here again, the curve portion 21 shows a rapid change of the base input impedance for a relatively small change of the collector current.

In accordance with the present invention, these rapid changes of the emitter, collector or base input impedances are utilized to provide an indication of the ambient temperature of the transistor. This may, for example, be effected by the bridge networks of Figures 6 and 7 to which reference is now made.

Figure 6:
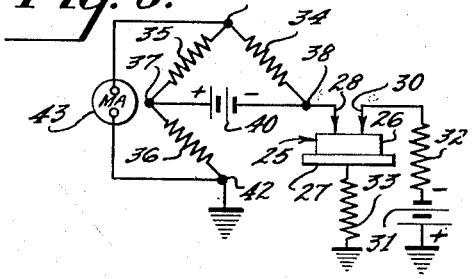
Figures 6 and 7 are circuit diagrams of temperature sensitive bridge networks including a transistor and illustrating two embodiments of the present invention.

The bridge network of Figure 6 includes a semiconductor device 25 having a semi-conducting body 26 such as a crystal of silicon or preferably of germanium. A base electrode 27 is in low-resistance contact with body 26. An emitter electrode 28 and a collector electrode 30 are in rectifying contact with the body 26.

A voltage in the reverse direction is applied between collector 30 and base 27. To this end, there is provided a suitable source of voltage such as battery 31 having its positive terminal grounded, while its negative terminal is connected to collector 30 through collector resistor 32. Base resistor 33 is connected between base 27 and ground. Collector 30 should be negative with respect to base 27 provided body 26 is of the N type. If body 26 should be of the P type, the polarity of the applied potential must be reversed.

The path between emitter 28 and base 27 and the base resistor 33 form one of the four arms of a bridge network. The remaining three arms of the bridge network are formed by the three resistors 34, 35 and 36 which are connected in series. Resistor 36 is grounded as shown. Point 37 is the junction point between resistors 35 and 36, and point 38 is the junction point between resistor 34 and emitter 28. A suitable source of voltage such as battery 40 is connected between the junction points 37 and 38. The battery 40 has the purpose of supplying a voltage in the forward direction between emitter 28 and base 27. Since base 27 will be normally maintained at a comparatively large negative potential due to the voltage drop across resistor 33, emitter 28 must be maintained at a slightly lower negative potential so that the potential between emitter 28 and base 27 will be positive. Accordingly, the negative terminal of battery 40 is connected to emitter 28. Battery 40 also serves the purpose of energizing the bridge network.

The other diagonal of the bridge network is formed by junction points 41 and 42, junction point 41 being the junction of resistors 34, 35, while junction point 42 is the grounded terminal of resistor 36. A current meter 43 is connected across junction points 41, 42.

The bridge network of Figure 6 is now balanced by adjustment of the resistors 34 to 36 for a predetermined ambient temperature of the transistor 25. When the ambient temperature of the transistor varies, the impedance which appears looking into the emitter electrode 28 or the emitter input impedance will vary substantially in the manner shown by curve 15 of Figure 2. The bridge network is adjusted in such a manner that the transistor exhibits a relatively large change of the impedance which appears looking into the emitter electrode in response to temperature changes. In other words, the transistor is biased to operate along the curve portion 16 of Figure 2. This is effected by properly adjusting the voltages applied by batteries 31 and 40 and by choosing an external base resistor 33 of appropriate value.

When the ambient temperature of the transistor varies, the shape of curve 15 will remain substantially unchanged. The thus resulting variation of the emitter input impedance will unbalance the bridge network so that a current will now flow between the junction points 41, 42 which is indicated by the current meter 43. The meter 43 should have a sufficiently wide range to indicate the changes of ambient temperature over a desired temperature range.

Figure 7:
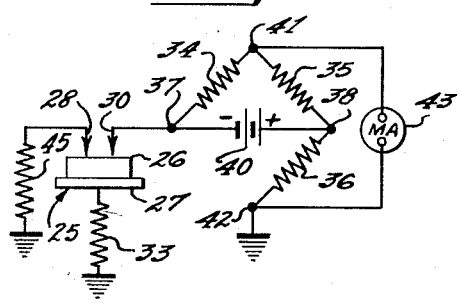

As illustrated in Figure 7, one of the four arms of the bridge network may also be formed by the path between collector 30 and base 27 including the base resistor 33. The other three arms of the bridge network are again formed by resistors 34 to 36. A current meter 43 is again connected across junction points 41, 42. A battery 40 is also connected between the other junction points 37, 38 of the bridge network. In this case, however, the battery 40 supplies the voltage to the collector 30 and accordingly the negative terminal of battery 40 is connected to collector 30. The required emitter bias voltage is obtained by providing a resistor 45 between emitter 28 and ground, as is conventional. The voltage drop across resistors 45 and 33 will maintain emitter 28 at a potential that is positive with respect to that of the base 27.

The bridge network of Figure 7 operates in a similar manner to that of Figure 6. The fourth arm of the bridge network is formed essentially by the impedance which appears looking into the collector electrode, that is, by the collector input impedance. The variations of this impedance with the collector current have been shown by curve 17 of Figure 3. The transistor 25 is again biased to operate along the curve portion 18 and a base resistor 33 of suitable magnitude is provided. The bridge network is balanced for a predetermined ambient temperature of the transistor 25. When the ambient temperature changes, the collector input impedance will vary along the curve portion 18 of Figure 3 thereby to unbalance the bridge. The resulting current which flows between junction points 41 and 42 is again indicated by the current meter 43.

It will be evident that the impedance which appears looking into the base electrode or the base input impedance may also be connected in a bridge network similar to those shown in Figures 6 and 7 to form one of its arms, thereby to indicate changes of temperature. The variation of the base input impedance is shown in Figure 4 and the transistor should be adjusted to operate along the curve portion 21 of Figure 4.

In accordance with the present invention, a transistor may also be adjusted in such a manner that a large change of the collector current with a simultaneous relatively small change of the emitter current is caused in response to changes of the ambient temperature of the transistor. A regenerative transistor circuit which may be used for indicating temperature has been shown in Figure 8. The transistor again is provided with a base resistor 33 and the emitter bias voltage is developed by the base resistor 33 and the emitter resistor 45 which provide the necessary emitter bias voltage. The collector battery 31 is connected to the collector electrode 30 through the current relay 46. The relay 46 has a normally open contact 47 connected in series with an indicator lamp 48 and a battery 50. Accordingly, when the relay 46 is energized by a current of sufficient strength, the contact 47 closes and the indicator lamp 48 lights up. The indicator lamp 48 may also be replaced by a temperature controlled device.

Figure 5:
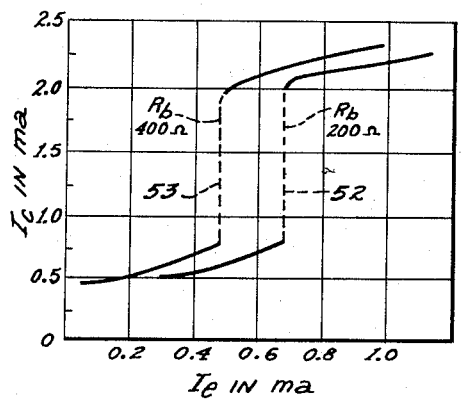
Figure 5 is a graph showing curves illustrating the collector current as a function of the emitter current under different conditions.
Figure 8:
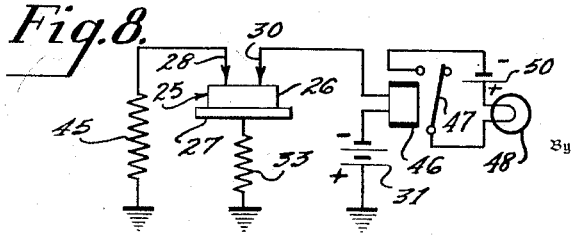
Figure 8 is a circuit diagram of a temperature responsive regenerative semi-conductor circuit, being a further embodiment of the present invention.

Referring now to Figure 5 there is plotted the collector current $I_c$ as a function of the emitter current $I_e$. Curves 52 and 53 have been obtained with an external base resistance 33 ($R_b$) of 200 and 400 ohms respectively. It will be seen that under proper bias conditions and with the proper choice of the base resistance, the collector current suddenly jumps from less than 1 milliampere to approximately 2 milliamperes. Accordingly, the transistor 25 of Figure 8 is biased in the neighborhood of the rapid change of the collector current with a suitable value of the external base resistance 33. Consequently, when the ambient temperature of the transistor changes, the collector current will suddenly change to a much higher value, thus energizing relay 46 which may be indicated by the lamp 48 or in any other suitable manner. The circuit of Figure 8, of course, is a trigger circuit and will only indicate that the ambient temperature of the transistor has exceeded a predetermined value or has fallen below a predetermined value. It is, of course, also feasible to connect a conventional amplifier such as a vacuum tube amplifier between collector 30 and relay 46 so that the resistance of the relay will not limit the choice of the transistor circuit constants.

Transistors have been classified in accordance with their characteristics into several classes. However, the bridge circuits of Figures 6 and 7 or the trigger circuit of Figure 8 may be used with any of these types of transistors. A transistor having a short-circuit current gain of less than unity will, of course, be less sensitive than one having a current gain greater than unity. However, it has been found that either of these types of transistors may be used with the circuits of the present invention.

There have thus been disclosed temperature responsive circuits which make use of a transistor. A change of the ambient temperature of the transistor may cause a rapid change of one of its internal impedances with a simultaneous small change of the collector current in response to changes of the ambient temperature. Alternatively, a rapid change of the collector current with a simultaneous relatively small change of the emitter current may be obtained in response to changes of the ambient temperature. These changes of the circuit parameters of a transistor in response to variations of the temperature are utilized in accordance with the present invention to provide an indication of the temperature. This may be effected, for example, by a bridge network or by a trigger circuit arranged to energize a relay.

What is claimed is:

1. A temperature responsive electrical system comprising a semi-conductor device including a semi-conducting body, a base electrode, an emitter electrode and a collector electrode in contact with said body, an impedance element connected between said base electrode and a point of substantially fixed potential, means including a source of potential connected between said point of substantially fixed potential and said emitter and collector electrodes for applying a voltage in the forward direction between said emitter and base electrodes and for applying a voltage in the reverse direction between said collector and base electrodes, a bridge network having two impedance arms connected across said source in series, said bridge network having a third impedance arm and a fourth arm including the path between two electrodes of said device, said third and fourth arms being connected across said first impedance arms, said bridge network being balanced for a predetermined ambient temperature of said device, and means coupled to said bridge network and responsive to the unbalance of said bridge network resulting from changes of said ambient temperature.

2. A temperature responsive electrical system comprising a semi-conductor device including a semi-conducting body, a base electrode, an emitter electrode and a collector electrode in contact with said body, a resistor connected between said base electrode and a point of substantially fixed potential, means including a source of potential connected between said point of substantially fixed potential and said emitter and collector electrodes for applying a voltage in the forward direction between said emitter and base electrodes and for applying a voltage in the reverse direction between said collector and base electrodes, a bridge network having two impedance arms connected across said source of potential, said bridge network having a third impedance arm and a fourth arm including the path between two electrodes of said device and said resistor, said third and fourth arms being connected across said source, said bridge network being balanced for a predetermined ambient temperature of said device, and means connected across two arms of said bridge network including said fourth arm and responsive to the unbalance of said bridge network resulting from changes of said ambient temperature.

3. A temperature responsive bridge network comprising a semi-conductor device including a semi-conducting body, a base electrode, an emitter electrode and a collector electrode in contact with said body, a first resistor connected to said base electrode, a source of voltage and a second resistor connected serially between said first resistor and said collector electrode, said source being poled to apply a voltage between said collector and base electrodes in the reverse direction, said network including three impedance elements forming three of the four arms of said bridge network, the fourth arm of said bridge network consisting of the emitter to base path and said first resistor, a further source of voltage connected across one diagonal of said bridge network and having one terminal connected to said emitter electrode, said further source of voltage being poled to apply a voltage in the forward direction between said emitter and base electrodes, and a current responsive element connected across the other diagonal of said bridge network, said bridge network being balanced for a predetermined ambient temperature of said device and becoming unbalanced upon change of said ambient temperature.

4. A temperature responsive bridge network comprising a semi-conductor device including a semi-conducting body, a base electrode, an emitter electrode and a collector electrode in contact with said body, a resistor connected to said base electrode, means connected between said resistor and said emitter electrode to apply a voltage in the forward direction between said emitter and base electrodes, said bridge network including three impedance elements forming three of the four arms of said bridge network, the fourth arm of said bridge network consisting of the collector to base path and said resistor, a source of potential connected across one diagonal of said bridge network, said source having one terminal connected to said collector electrode and being poled to apply a voltage in the reverse direction between said collector and base electrodes, and a current responsive element connected across the other diagonal of said bridge network, said bridge network being balanced for a predetermined ambient temperature of said device and becoming unbalanced upon change of said ambient temperature.

5. A temperature responsive bridge network comprising a semi-conductor device including a semi-conducting body, a base electrode, an emitter electrode and a collector electrode in contact with said body, a first resistor connected to said base electrode, a second resistor connected between said first resistor and said emitter electrode for applying a voltage in the forward direction between said emitter and base electrodes, said bridge network including three impedance elements forming three of the four arms of said bridge network, the fourth arm of said bridge network consisting of the collector to base path and said first resistor, a source of potential connected across one diagonal of said bridge network, said source having one terminal connected to said collector electrode and being poled to apply a voltage in the reverse direction between said collector and base electrodes, and a current responsive meter connected across the other diagonal of said bridge network, said bridge network being balanced for a predetermined ambient temperature of said device and becoming unbalanced upon change of said ambient temperature.

References Cited in the file of this patent

UNITED STATES PATENTS

| Number | Name | Date |
|---|---|---|
| 2,366,614 | Hansell | Jan. 2, 1945 |
| 2,524,033 | Bardeen | Oct. 3, 1950 |
| 2,557,224 | Hornfeck | June 19, 1951 |

OTHER REFERENCES

The Transistor, Becker and Shive, pub. in Electrical Engineering, March 1949, pp. 215–221.

Some Circuit Aspects of the Transistor, Ryder and Kircher, pub. in The Bell System Technical Journal, vol. XXVIII, No. 3, July 1949, pp. 372 and 375.